United States Patent [19]

Tomforde

[11] Patent Number: 4,917,433
[45] Date of Patent: Apr. 17, 1990

[54] MOTOR VEHICLE DOOR WITH A MULTI-SHELL DOOR BODY

[75] Inventor: Johann Tomforde, Sindelfingen, Fed. Rep. of Germany

[73] Assignee: Daimler-Benz AG, Stuttgart, Fed. Rep. of Germany

[21] Appl. No.: 237,321

[22] Filed: Aug. 29, 1988

[30] Foreign Application Priority Data

Aug. 28, 1987 [DE] Fed. Rep. of Germany ....... 3728778

[51] Int. Cl.⁴ ............................................... B60J 5/04
[52] U.S. Cl. ..................................... 296/146; 296/188; 296/201; 296/202; 49/502
[58] Field of Search ............... 296/188, 189, 146, 201, 296/202, 901; 49/502

[56] References Cited

U.S. PATENT DOCUMENTS

| | | | |
|---|---|---|---|
| 3,449,881 | 6/1969 | Wilfert | 296/146 X |
| 4,153,290 | 5/1979 | Barenyi | 296/191 |
| 4,196,929 | 4/1980 | Bauer | 296/146 X |
| 4,306,381 | 12/1981 | Presto | 49/502 |
| 4,651,470 | 3/1987 | Imura et al. | 296/146 X |
| 4,685,722 | 8/1987 | Srock | 296/188 |
| 4,793,099 | 12/1988 | Friese et al. | 296/146 X |

FOREIGN PATENT DOCUMENTS

| | | | |
|---|---|---|---|
| 128621 | 12/1984 | European Pat. Off. | 296/146 |
| 2426705 | 12/1975 | Fed. Rep. of Germany | 296/146 |
| 3425776 | 1/1986 | Fed. Rep. of Germany | 296/188 |
| 171714 | 9/1984 | Japan | 296/146 |

Primary Examiner—Dennis H. Pedder
Attorney, Agent, or Firm—Barnes & Thornburg

[57] ABSTRACT

The invention relates to a motor vehicle door with a multi-shell door body, into which a door pane running on guides can be lowered. An inner wall of the door body extends essentially with a closed surface over the height of the door body, while an outer wall of the door body is divided along a horizontal joining line and has a removable anti-ram trim as a lower wall portion. A transverse reinforcement which extends in the direction of the depth of the motor vehicle door is arranged in the region near the joining line, and starting from the upper wall portion of the outer wall. In order to achieve the best possible deformation behavior of the motor vehicle door in the event of collisions with the least possible use of material, provision is made that the transverse reinforcement is formed by a transverse wall with a pane shaft matched to the passage width of the pane guides, the transverse wall merging into an intermediate wall extending downwards relative to the door between the inner wall and the plane of the pane guides, and the transverse wall being connected to the bottom of the door body via the intermediate wall.

18 Claims, 3 Drawing Sheets

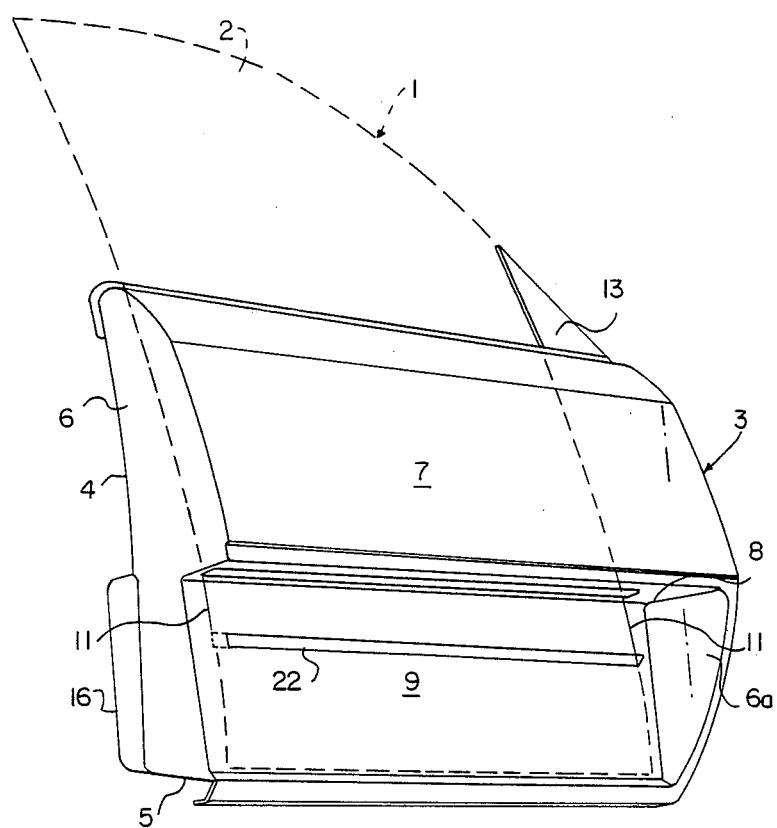
FIG. IA

MOTOR VEHICLE DOOR WITH A MULTI-SHELL DOOR BODY

BACKGROUND AND SUMMARY OF THE INVENTION

The invention is concerned with a motor vehicle door with a multi-shell door body which includes pane guides for a lowerable door window pane and a removable anti-ram trim as a lower wall portion.

Such a motor vehicle door is described in German Patent (DE-PS) No. 3,425,776. The basic supporting structure of the door body of this motor vehicle door consists of an inner wall, lateral door end walls and a door bottom which, formed from sheet metal, are welded to one another. An outer wall of the door body connected releasably to the basic structure is intended to be utilized as far as possible to improve the design strength of the door body. However, this can be guaranteed completely only when the two portions of the longitudinally divided outer wall consist of metal sheets, the elasticity behavior of which corresponds approximately to that of the sheets of the basic structure. Since the two portions are connected to one another along their common joining line in a tension-resistant manner by means of an annular bearer arranged in the door interior, the door body, when subjected to impact stress in the event of a collision, exhibits a deformation behavior which is closely comparable to that of conventionally used two-shell motor vehicle doors with a continuous outer wall.

However, the deformation behavior shows a pronounced change when the lower portion of the outer wall is formed by an anti-ram trim, as is likewise provided according to the above-mentioned publication.

In accordance with the intended use of anti-ram trims, their elasticity behavior must be such that, after deformation as a result of light ramming shocks, such as often occur during parking maneuvers, they spring back into their initial form again. They therefore consist of hard elastic plastics.

Because of their deformation behavior, anti-ram trims are therefore unsuitable for making an adequate contribution to increasing the design strength of the door body. This deficiency is mitigated somewhat in the known door design because the door body is stiffened in the transverse direction of the door by means of the annular bearer, since at least the upper half of the door thereby has the desired deformation behavior. Nevertheless, the pane shaft provided in the annular bearer has to be provided with a clear excess width, so that the customary mounting of the pane guides, in which these are pushed into the door body from above, can be preserved. The result of this is that a cross section with a high moment of resistance has to be chosen for the annular bearer, so that this can span the clear width in the desired way. Consequently, the annular bearer acquires the nature of a door stiffener comparable to reinforcing sections which are used to increase the lateral impact strength. However, on the other hand, in door bodies with an outer wall divided approximately into two halves there is not the best possible height arrangement for such a reinforcing section, since this should be integrated in the door body most approximately somewhat above conventional bumper heights of motor vehicles. If, in addition to the annular bearer, a reinforcing section underneath the latter were to be used, it would be supported precisely on the supporting structure located in the lower door portion and having only low design strength. It would also be difficult to make a connecting junction between the ends of the reinforcing section and the end faces of the door body.

For the reasons explained, an object of the invention is to develop further a motor vehicle door of the relevant generic type, to the effect that, while ensuring the least possible use of material, it can guarantee a clearly improved supporting behavior under impact stress in the event of a collision.

According to the invention, this object is achieved by a door construction wherein the transverse reinforcement is formed by a transverse wall with a pane shaft matched to the passage width of the pane guides, wherein the transverse wall merges into an intermediate wall extending downwards relative to the door between the inner wall (inside the door panel) and the plane of the pane guides, and wherein the transverse wall is connected to the bottom of the door body via the intermediate wall. In the construction of especially preferred embodiments of the invention, there is formed a supporting wall which extends over the entire door height of the door body and which is connected to the inside door pane via the two door end walls and the door bottom to form a common basic supporting structure of the door body.

Since the pane shaft in the transverse wall takes the form of only a narrow slit, a simple sheet metal wall is sufficient as a transverse reinforcing section.

Preferably, the upper wall portion, the transverse wall and the intermediate wall are designed as a one piece deep drawn article, as a result of which they can be welded continuously to the connecting sheets and require no separate connection to one another.

If a height offset for a sill catch is provided in the bottom of the door body according to certain preferred embodiments, the portion of hook-shaped profile of the door bottom should be formed by a downwardly projecting edge portion of the intermediate wall. As a result, the sill catch remains effective under the influence of the deforming intermediate wall even if a welding seam between an approximately horizontal portion of the door bottom and the intermediate wall were to break.

To improve passenger safety in collisions even further according to certain preferred embodiments, there is arranged additionally between the pane guides and the anti-ram trim of the door body a reinforcing section which is supported on the intermediate wall in the direction of the depth of the door body. Preferably, the reinforcing section is formed by a U-shaped bar of tubular cross section, of which the ends, engaging around the lower plane between the pane guides, are angled at 90°. The advantage of a closed wall tube cross section is a high bending resistance and at the same time a low dead weight. The tubular bar can easily be fastened, when the anti-ram trim is removed, by means of screw flanges welded on the end face, since these are readily accessible from outside.

To make it easier to install the pane guides, they can be combined with the reinforcing section to form an assembly unit according to certain preferred embodiments. For mounting, with visual checking the assembly unit can be pushed upwards through the narrow pane shaft, with the guide rails in front, until the installation position of the reinforcing section is reached. Thus, as a result of the operation of screwing on the reinforcing section, at the same time the guide rails are fastened in the door body. It is also advantageous if the entire adjusting mechanism for the guide rails and the associated lifting mechanism, together with the drive motor, are locked with the assembly unit. All the necessary operations for adjusting the pane guides are thereby possible from the easily accessible installation space, this saving time both during initial assembly and in maintenance work.

Other objects, advantages and novel features of the present invention will become apparent from the following detailed description of the invention when considered in conjunction with the accompanying drawings.

BRIEF DESCRIPTION OF THE DRAWINGS

FIGS. 1A and 1B are perspective views of a basic supporting structure of a front side door of a motor vehicle, constructed in accordance with preferred embodiments of the invention respectively.

DETAILED DESCRIPTION OF THE DRAWINGS

Figure 1B:
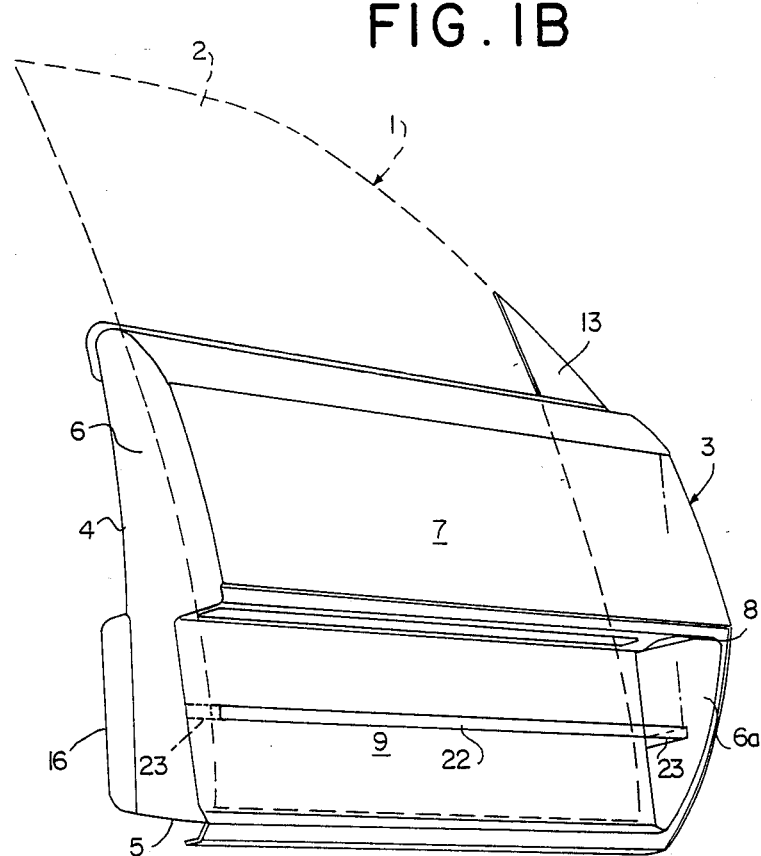
Figure 2:
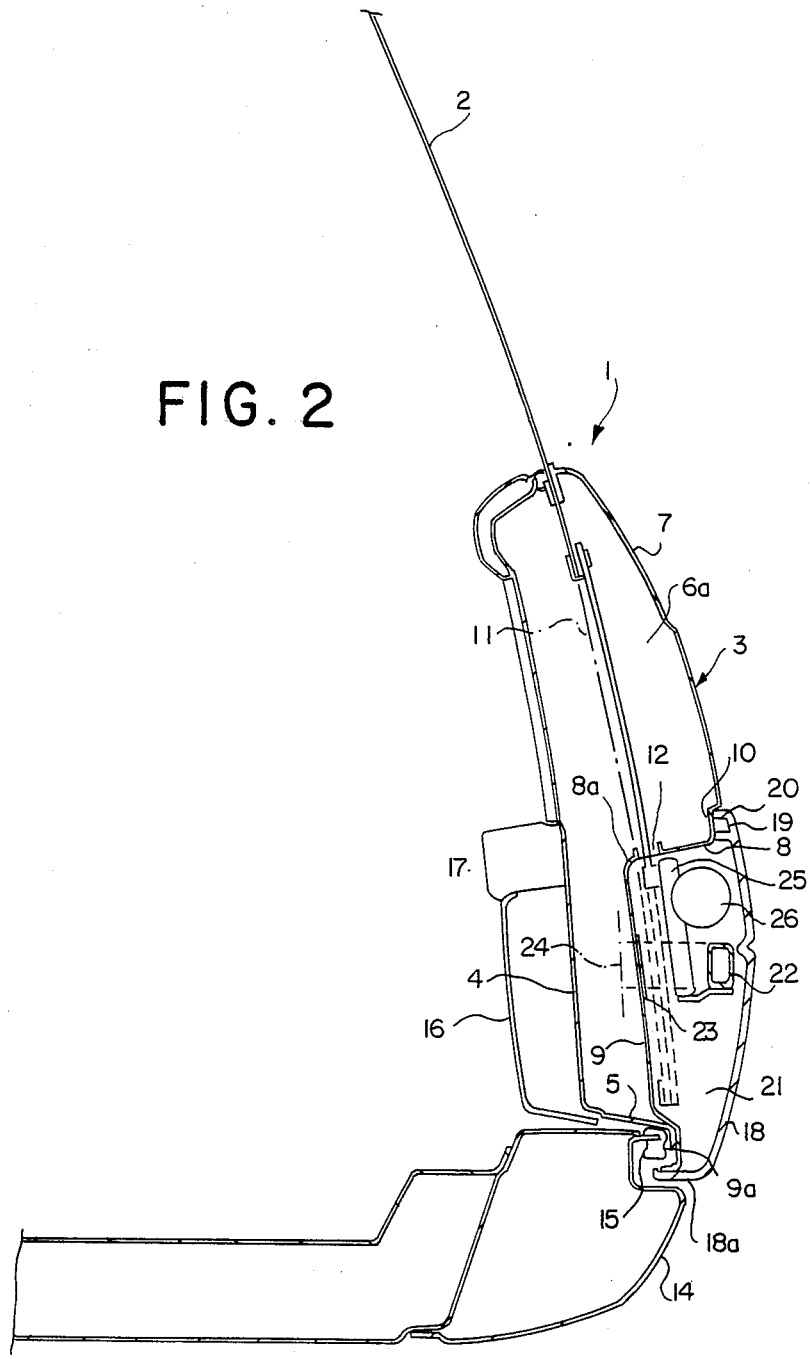
FIG. 2 is a diagrammatic vertical sectional view through the basic structure according to FIG. 1, completed by installation parts and an anti-ram trim.

The mainly supporting basic structure of a motor vehicle door 1 with a frameless side pane 2 is formed by deep drawn sheet metal moldings of a door body 3 which are welded to one another. It comprises an inside door panel 4 merging into a door bottom 5, lateral door end walls 6 and 6a, an outside door panel 7 forming the upper half of the outside door planking, a transverse wall 8 and an intermediate wall 9. A lower edge of the outside door panel 7 is shaped to form a recess 10 and merges continuously into the transverse wall 8 which is angled approximately 90° relative to the plane of the outside door panel 7 in the direction of the depth of the door body 3. The transverse wall 8 extends so far into the interior of the door body 3 that it intersects the lowering plane of the side pane 2 which extends approximately centrally in the door body 3 and which is determined by pane guides 11. The pane guides 11 not shown in detail can be formed, for example, by rails of U-shaped cross section which engage in a fork-shaped manner around the front and rear edges of the side pane 2. So that the side pane 2 can be lowered completely, the pane guides 11 extend into the region near the door bottom 5, and they pass through a pane shaft 12 in the transverse wall 8. The pane shaft 12 is only slightly wide than the pane guides 11 and has a clearly smaller length than the transverse wall 8, in relation to the length of which the pane shaft 12 is arranged virtually centrally. This length difference is possible because the longitudinal extension of the side pane 2 is shorter than the longitudinal extension of the door body 3 by the amount of the constructional length of a mirror triangle 13, thus affording the possibility of lowering the side pane 2 obliquely and at the same time advancing it in the direction of the front end wall 6a.

Because of this dimensioning of the pane shaft 12, there is still a sufficient capacity for transmitting deformational forces despite the weakening of the transverse wall 8 caused by it. This transmission capacity can be increased further if the pane shaft 12 is not stamped out from the transverse wall 8, but only a shortened severing cut is made and is widened during a process for deep drawing the transverse wall 8 to its final cross section.

This produces a continuous raised collar 8a which markedly increases the rigidity of the transverse wall 8.

On the side facing the inside door panel 4, the transverse wall 8 merges likewise continuously into the intermediate wall 9 directly behind the pane guides 11. The intermediate wall 9 is angled approximately 90° downwards out of the plane of the transverse wall and thus extends virtually parallel to the outside door panel 7. Whereas the outside door panel 7 is curved slightly, in contrast the intermediate wall 9 is completely plane right into the vicinity of the door bottom 5. Underneath the pane guides 11, the door bottom 5 has a downwardly projecting hook-shaped profile, the profile engaging around a laterally projecting retention profile of a door sill 14 when the motor vehicle door 1 is closed. The retention profile is formed by welding seam 15 of the multi-shell door sill 14.

To ensure that the intermediate wall 9 contributes to the sill catch under all possible conditions, the portion of hook-shaped profile of the door bottom 5 is formed by a lower edge portion 9a of the intermediate wall 9 itself. For this purpose, the edge portion 9a is bent in a hook-shaped manner underneath the pane guides 11 and projects downwards in relation to the level of the remaining door bottom. If the strength of the edge portion 9a is sufficient for the absorption of force, it can be welded to the junction plate of the door bottom 5 above the hook-shaped cross section. The edge portion 9a thereby replaces a surface portion of the door bottom 5, and this can be desirable for reasons of lightweight construction. Alternatively, however, it is also contemplated to weld the junction plate to the edge portion 9a so as to overlap completely, in order to increase the bending strength.

To prevent the possibility of joining defects in the bond between the outside door panel 7, the transverse wall 8 and the intermediate wall 9, including the edge portion 9a, this unit as a whole is designed as a one piece deep drawn article which, here, is pressed from high tensile sheet steel.

The basic structure of the door body 3 explained above has virtually the impact resistance present in motor vehicle doors of the conventional type with a continuous inside and outside door panel. However, it is necessary to take into account that the deformation path of the intermediate wall 9 up to the inside door panel 4 is less than that of the outside door panel 7, so that, in collisions, it can occur more easily that the inside door panel 4 is also deformed. So that a deformation of the inside door panel 4 in the lower half of the motor vehicle door 1 does not have a direct effect on the seat width, this portion of the door body 3 is covered over the entire length of the door with a spacer trim 16 which, over its length, can have a differing depth extension, depending on the free space available. In order to utilize the constructional space lost as a result, door storage shells 17 or the like can be integrated in the spacer trim 16.

When the motor vehicle door 1 is assembled, the transverse wall 8 and the intermediate wall 4 are invisible from the outside in the interior of the door body 3, since the lower half of the outer wall of the door is covered relative to the outside by an anti-ram trim 18 made of hard elastic plastic. As seen in cross section, this anti-ram trim 18, starting from the recess 10, extends to below the lower edge of the edge portion 9a, and it is curved slightly in a continuation of the curve of the outside door panel 7. A lower flanged edge 18 and lateral flanged edges which cannot be seen are angled inwards relative to the door, so that the anti-ram trim 18 can be pushed in the manner of a cover onto the door end walls 6 and 6a and the edge portion 9a. The flanged edges 18 can subsequently be screwed together from the door end walls 6 and 6a or from below and are not accessible when the motor vehicle door 1 is closed. To fasten the upper edge of the anti-ram trim 18 in the recess 10, there is merely a positive plug connection, a profile strip 19 clipped to the bottom of the recess 10 being surrounded by a mating fork-shaped flange 20 of the anti-ram trim 18. This provides a sufficient tensile support of the anti-ram trim 18 on the outside door panel 7 when the anti-ram trim 18 springs inwards somewhat under light ramming shocks.

The anti-ram trim 18 thus covers in relation to the outside a relatively large cavity of the door body 3 which, because of good accessibility when the anti-ram trim 18 is removed, can be used with preference as an installation space 21.

To increase passenger safety in the event of a lateral impact even further, a tubular bar 22 having a clear rectangular cross section is arranged as a reinforcing section in the installation space 21. The tubular bar 22 extends somewhat above conventional bumper heights of passenger cars horizontally over the entire length of the door. At the same time, it extends near to and along the inner face of the anti-ram trim 18, leaving free the space between the pane guides 11, and is bent inwards relative to the door at both ends, its angled ends reaching up to the intermediate wall 9. To make it possible to fasten the tube ends to the intermediate wall 9 in a simple way, welded to the end faces of the tube ends are flat screw flanges 23 which allow screwing to the intermediate wall 9 and which make it possible to transmit forces from the tubular bar 22 into the intermediate wall 9 of a large area. As best seen in FIG. 1B, the reinforcing section 22 preferably spans a length of the door body and is supported on the intermediate wall 9 at its ends only. Furthermore, the tubular bar 22 is supported on the intermediate wall 9 level with a lower hinge position 24 of the motor vehicle door 1, the hinge position 24 being at the same height as a lock position (not shown) of the door body 3. As a result of this support, when the tubular bar 22 undergoes impact stress, there is a beam tie effect which can offer the greatest possible passenger safety up to maximum deformations. Moreover, an accompanying deformation of the inside door panel 4 under a lateral impact is shifted towards higher deformation values.

So that an especially simple mounting of the pane guides 11 in the door body 3 is possible these can be connected to the tubular bar 22 in a way shown in FIG. 1A, to form a pre-assembled constructional unit. In addition, the constructional unit can also include a panel lifting mechanism 25 of a known type and an associated electric drive motor 26. When the anti-ram trim 18 is removed, this pre-assembled constructional unit can be mounted easily because of the depth offset of the installation space 21 relative to the outside door panel 7. For this purpose, the constructional unit is first attached underneath the transverse wall 8, with the pane guides 11 inclined slightly relative to their installation position, and the pane guides 11 are introduced into the narrow cross section of the pane shaft 12 by lifting the constructional unit. Since the pane shaft 12 is in the fitter's field of vision, this introduction operation presents no problem. Subsequently, the constructional unit, maintaining its inclined lateral inclination, is pushed upwards in the plane of the pane guides 11, until the installation height of the tubular bar 22 is reached. Since a transverse advance of the constructional unit is now no longer impeded by the overlap of the edge portion 9a with the pane guides 11, the constructional unit can be swung into the steeper position corresponding to the installation position, the two screw flanges 23 coming to bear on the intermediate wall 9. By screwing the screw flanges 23 to the intermediate wall 9, the tubular bar 22 and, at the same time, the guide rails 11 fastened to the tubular bar 22, the pane lifting mechanism 25 and the drive motor 26 are attached to the door body 3. The assembly time is thus reduced to a minimum in relation to the previous procedure for installing pane guides. The same applies to fine adjustments of the pane guides 11 which are necessary under certain circumstances and can all be made in the easily accessible installation space 21 and which have hitherto been very time consuming particularly where frameless side panes 2 are concerned.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Motor vehicle door with a multi-shell door body, into which a door pane running on pane guides can be lowered, comprising:
   an inner wall extending essentially with a closed surface over a height of the door body and connected to a bottom of the door body;
   an outer wall divided along a horizontal joining line into a upper wall portion and a lower wall portion, a removable anti-ram trim forming the lower wall portion of the outer wall;
   in a region near the joining line, a transverse reinforcement which starts from the upper wall portion of the outer wall and extends in a direction of a depth of the motor vehicle door, the transverse reinforcement having a pane shaft which is matched to a passage width of the pane guides for receiving the door pane, the transverse reinforcement being formed by a transverse wall; and
   an intermediate wall extending downwards relative to the door between the inner wall and a plane of the pane guides, the intermediate wall connecting the transverse wall to the bottom of the door body.

2. Motor vehicle door according to claim 1, wherein the upper wall portion, the transverse wall and the intermediate wall are a one piece unit.

3. Motor vehicle door according to claim 1, wherein the bottom of the door body has a hook-shaped profile and, when the motor vehicle door is closed, engages around a raised protruding retention profile of a door sill.

4. Motor vehicle door according to claim 3, wherein a portion of the hook-shaped profile of the bottom is formed by a lower edge portion of the intermediate wall.

5. Motor vehicle door according to claim 1, wherein a reinforcing section stiffening the door in the transverse direction of the door is arranged in an installation space limited by the transverse wall, the intermediate wall and the anti-ram trim and located in the door body.

6. Motor vehicle door according to claim 5, wherein the reinforcing section spans a length of the door body and is supported on the intermediate wall at its ends only.

7. Motor vehicle door according to claim 6, wherein the reinforcing section extends near the anti-ram trim and in the end regions is bent in the direction of the depth of the door body.

8. Motor vehicle body according to claim 5, wherein the reinforcing section extends essentially horizontally through the installation space and is fastened to the intermediate wall level with a lower hinge position of the door body corresponding to the height of a door lock position.

9. Motor vehicle door according to claim 5, wherein the reinforcing section is a tubular bar bent in a U-shaped manner.

10. Motor vehicle door according to claim 5, wherein the reinforcing section is connectable to the pane guides.

11. Motor vehicle door according to claim 10, wherein the pre-assemblable constructional unit additionally includes a pane lifting mechanism.

12. Motor vehicle door according to claim 1, wherein a lower half of the inner wall is covered at least in places by an attached spacer trim.

13. Motor vehicle door according to claim 3, wherein the upper wall portion, the transverse wall and the intermediate wall are designed as a one piece unit.

14. Motor vehicle door according to claim 5, wherein the upper wall portion, the transverse wall and the intermediate wall are a one piece unit.

15. Motor vehicle door according to claim 7, wherein the reinforcing section extends essentially horizontally through the installation space and is fastened to the intermediate wall level with a lower hinge position of the door body corresponding to the height of a door lock position.

16. Motor vehicle door according to claim 15, wherein the upper wall portion, the transverse wall and the intermediate wall are a one piece unit.

17. Motor vehicle door according to claim 16, wherein the reinforcing section is connectable to the pane guides.

18. Motor vehicle door according to claim 16, wherein a lower half of the inner wall is covered at least in places by an attached dimensionally rigid spacer trim.

* * * * *